(12) United States Patent
Liu (10) Patent No.: US 11,849,412 B2
(45) Date of Patent: Dec. 19, 2023

(54) METHODS AND DEVICES OF SYNCHRONIZATION SIGNAL BLOCK TRANSMISSION AND DEMODULATION, BASE STATION AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 597 days.

(21) Appl. No.: 17/050,617

(22) PCT Filed: May 2, 2018

(86) PCT No.: PCT/CN2018/085377
§ 371 (c)(1),
(2) Date: Oct. 26, 2020

(87) PCT Pub. No.: WO2019/210468
PCT Pub. Date: Nov. 7, 2019

(65) Prior Publication Data
US 2021/0120508 A1    Apr. 22, 2021

(51) Int. Cl.
*H04W 56/00* (2009.01)
*H04B 17/382* (2015.01)
(Continued)

(52) U.S. Cl.
CPC ........ *H04W 56/001* (2013.01); *H04B 17/382* (2015.01); *H04W 16/28* (2013.01); *H04W 72/30* (2023.01)

(58) Field of Classification Search
CPC . H04W 16/28; H04W 56/0005; H04W 72/30; H04W 76/27; H04B 17/0014; H04B 17/373; H04B 17/382; H04B 17/391
See application file for complete search history.

(56) References Cited

U.S. PATENT DOCUMENTS

| 2018/0262308 A1* | 9/2018 | Si .................. H04W 56/0005 |
| 2020/0163052 A1* | 5/2020 | Ko ........................ H04W 72/30 |
| 2021/0120585 A1* | 4/2021 | Yang .................... H04W 76/27 |

FOREIGN PATENT DOCUMENTS

| CN | 104601266 A | 5/2015 |
| CN | 106658751 A | 5/2017 |

(Continued)

OTHER PUBLICATIONS

ISA State Intellectual Property Office of the People's Republic of China, International Search Report Issued in Application No. PCT/CN2018/085377, dated Jan. 30, 2019, WIPO, 4 pages.
(Continued)

*Primary Examiner* — Michael Thier
*Assistant Examiner* — Prince A Mensah
(74) *Attorney, Agent, or Firm* — SYNCODA LLC; Feng Ma (57) ABSTRACT

A synchronization signal block (SSB) transmission method includes: determining corresponding energy detection modes for a current SSB, the energy detection modes including a first or a second energy detection mode, the first energy detection mode configured to detect energy of a channel in respective beam directions of at least two SSBs in an SSB group where the current SSB is located before sending at least two SSBs in the SSB group where the current SSB is located, and the second energy detection mode configured to detect energy of a channel in the beam direction of the current SSB before sending the current SSB; and detecting the energy of the channel for the current SSB using the determined energy detection mode; if the channel is free, sending the current SSB. The needs of different frequency bands and different network distributions, etc. can be met in the case of NR-U independent networking.

18 Claims, 7 Drawing Sheets

(51) Int. Cl.
H04W 16/28 (2009.01)
H04W 72/30 (2023.01)

(56) References Cited

FOREIGN PATENT DOCUMENTS

| | | | |
|---|---|---|---|
| CN | 107820259 | A | 3/2018 |
| CN | 107835516 | A | 3/2018 |
| WO | 2017000374 | A1 | 1/2017 |
| WO | 2017196246 | A2 | 11/2017 |

OTHER PUBLICATIONS

3rd Generation Partnership Project; Technical Specification Group Radio Access Network; NR; Physical channels and modulation(Release 16),3GPP TS 38.211,V16.3.0, Sep. 2020, 133 pages.

3rd Generation Partnership Project; Technical Specification Group Radio Access Network;NR;Physical layer procedures for control(Release 16),3GPP TS 38.213,V16.3.0, Sep. 2020, 179 pages.

ISA State Intellectual Property Office of the People's Republic of China, Written Opinion of the International Searching Authority Issued in Application No. PCT/CN2018/085377, dated Jan. 30, 2019, WIPO, 9 pages.

InterDigital Inc. "Considerations on Synchronization Signal for NR Unlicensed Spectrum", 3GPP TSG RAN WG1 Meeting 92, Athens, Greece, R1-1802647, Feb 26-Mar. 2, 2018, 3 pages.

* cited by examiner

METHODS AND DEVICES OF SYNCHRONIZATION SIGNAL BLOCK TRANSMISSION AND DEMODULATION, BASE STATION AND USER EQUIPMENT

CROSS-REFERENCE TO RELATED APPLICATION

This application is a national stage of International Application No. PCT/CN2018/085377 filed on May 2, 2018, the disclosure of which is hereby incorporated by reference in its entirety.

TECHNICAL FIELD

Embodiments of the present disclosure relate to the field of communication technology, and more particularly, to a method and a device of synchronization signal block (SSB) transmission, a method and a device of SSB demodulation, a base station, user equipment, and a computer-readable storage medium.

BACKGROUND

With the rapid development of wireless communication technology, the fifth generation of mobile communication technology (5th Generation, 5G for short) has emerged. The Third Generation Partnership Project (3rd Generation Partnership Project, 3GPP) has launched recently a study on the 5G New Radio Unlicensed Spectrum (NR-U). Most believe that NR-U can stand alone. And it is also believed that the design of 5G New Radio (NR) should be inherited to the NR-U as much as possible. In the design of unlicensed spectrum, the first thing that needs to be considered is relevant laws and regulations in various regions over the world, for example, listen before talk (LBT for short), that is, energy must be detected before a signal is transmitted.

Most companies have proposed concepts of multiplexing synchronization signal block (SSB) in NR in the 5G NR. The transmission pattern of SSB is related to frequency in NR. In the sake of ultra-high reliability and ultra-low latency (Ultra Reliable and Low Latency Communication, URLLC) service, there are reserved slots in many patterns of SSB for symbols and different frequency bands have different patterns.

SUMMARY

In view of this, this disclosure discloses a method and a device of SSB transmission, a method and device of SSB demodulation, a base station, user equipment, and a computer-readable storage medium, so that it is highly flexible for a base station to perform LBT on SSB when NR-U stands alone, thereby satisfying requirements of various frequency bands and various deployments of network.

According to a first aspect of embodiments of the present disclosure, a method of synchronization signal block (SSB) transmission is provided, the method is applicable to a base station, and includes:
  determining an energy detection mode for a current SSB, wherein the energy detection mode includes a first energy detection mode which is configured to perform, before transmitting at least two SSBs in an SSB group where the current SSB is located, energy detection on a channel in respective beam directions of the at least two SSBs, or a second energy detection mode which is configured to perform, before transmitting the current SSB, energy detection on a channel in a beam direction of the current SSB;
  performing energy detection on a channel for the current SSB through the determined energy detection mode; and
  transmitting the current SSB in a case that the channel for the current SSB is idle.

In an embodiment of the present disclosure, determining the energy detection mode for the current SSB includes:
  determining, in a case that either the frequency band of the SSB group where the current SSB is located or the frequency band of the current SSB belongs to a first frequency band, the first energy detection mode as the energy detection mode for the current SSB; or
  determining, in a case that either the frequency band of the SSB group where the current SSB is located or the frequency band of the current SSB belongs to the second frequency band, the second energy detection mode as the energy detection mode for the current SSB.

In an embodiment of the present disclosure, determining the energy detection mode for the current SSB includes:
  acquiring, from the current SSB, configuration information to configure the first energy detection mode for the SSB group where the current SSB is located or to configure the second energy detection mode for the current SSB;
  determining the energy detection mode for the current SSB according to the configuration information.

In an embodiment of the present disclosure, the method further includes:
  generating the configuration information;
  adding, to the physical broadcast channel (PBCH) of the current SSB, the configuration information.

In an embodiment of the present disclosure, the first energy detection mode or the second energy detection mode is set in a half-frame or a radio frame.

According to a second aspect of the embodiments of the present disclosure, a method of synchronization signal block SSB demodulation, applicable to user equipment UE, is provided, the method includes:
  receiving, from a base station, a current SSB;
  acquiring, from the current SSB, an index, a frame number and a half-frame indication of the current SSB;
  determine an energy detection mode for the current SSB, wherein the energy detection mode includes a first energy detection mode configured to perform, before transmitting at least two SSBs in an SSB group where the current SSB is located, energy detection on a channel in respective beam directions of the at least two SSBs, or a second energy detection mode configured to perform, before transmitting the current SSB, energy detection on a channel in a beam direction of the current SSB.
  determining an SSB position in the determined energy detection mode;
  obtaining an absolute position of the current SSB according to the index, the frame number and the half-frame indication of the current SSB, and the position of the SSB.

In an embodiment of the present disclosure, determining the energy detection mode for the current SSB includes:
  determining, in a case that either the frequency band of the SSB group where the current SSB is located or the frequency band of the current SSB belongs to the first frequency band, the first energy detection mode as the energy detection mode for the current SSB; or Determining, in a case that either the frequency band of the SSB group where the current SSB is located or the frequency band of the current SSB belongs to the second frequency band, the second energy detection mode as the energy detection mode for the current SSB.

In an embodiment of the present disclosure, determining the energy detection mode for the current SSB includes:
  determining, through analyzing the current SSB, a physical broadcast channel PBCH;
  determining, through analyzing the PBCH, configuration information to configure the first energy detection mode for the SSB group where the current SSB is located or to configure the second energy detection mode for the current SSB; and
  determining the energy detection mode for the current SSB according to the configuration information.

According to a third aspect of the embodiments of the present disclosure, a device of synchronization signal block SSB transmission, applicable to a base station, is provided, the device includes:
  a first determining module, configured to determine, for the current SSB, an energy detection mode which includes a first energy detection mode configured to perform, before transmitting at least two SSBs in an SSB group where the current SSB is located, energy detection on a channel in respective beam directions of the at least two SSB in the SSB group where the current SSB is located, or a second energy detection mode the second energy detection mode is configured to perform, before transmitting the current SSB, energy detection on a channel in a beam direction of the current SSB;
  a second determining module, configured to perform, through the energy detection mode determined by the first determining module, energy detection on a channel for the current SSB;
  a transmitting module, configured to transmit, in a case that the second determining module determines that the channel is idle, the current SSB.

In an embodiment of the present disclosure, the first determining module includes:
  a first determining submodule, is configured to determine, in a case that either the frequency band of the SSB group where the current SSB is located or the frequency band of the current SSB belongs to the first frequency band, the first energy detection mode as the energy detection mode for the current SSB; or
  a second determining submodule is configured to determine, in a case that either the frequency band of the SSB group where the current SSB is located or the frequency band of the current SSB belongs to the second frequency band, the second energy detection mode as the energy detection mode for the current SSB.

In an embodiment of the present disclosure, the first determining module includes:
  an acquiring submodule, configured to acquire, from the current SSB, configuration information to configure the first energy detection mode for the SSB group where the current SSB is located or to configure the second energy detection mode for the current SSB;
  a third determining submodule, configured to determine, according to the configuration information acquired by the acquiring submodule, the energy detection mode for the current SSB.

In an embodiment of the present disclosure, the device further includes:
  a generating module, configured to generate the configuration information;
  an adding module, configured to add, to the physical broadcast channel (PBCH) of the current SSB, the configuration information generated by the generating module.

In an embodiment of the present disclosure, the first energy detection mode or the second energy detection mode is set in a half frame or a radio frame.

According to a fourth aspect of the embodiments of the present disclosure, a device of synchronization signal block SSB demodulation, applicable to user equipment UE, is provided, and the device includes:
  a receiving module, configured to receive, from a base station, a current SSB;
  an acquiring module, configured to obtain, from the current SSB received by the receiving module, an index, a frame number, and a half-frame indication of the current SSB;
  a detection mode determining module, configured to determine, for the current SSB received by the receiving module, an energy detection mode for the current SSB received by the receiving module, wherein the energy detection mode includes a first energy detection mode configured to perform, before transmitting at least two SSBs in an SSB group where the current SSB is located, energy detection on a channel in respective beam directions of the at least two SSBs in the SSB group where the current SSB is located, or a second energy detection mode configured to perform, before transmitting the current SSB, energy detection on a channel in a beam direction of the current SSB;
  a position determining module, configured to determine an SSB position in the energy detection mode determined by the detection mode determining module; and
  an obtaining module, configured to obtain, an absolute position of the current SSB according to the index, the frame number, and the half-frame indication of the current SSB obtained by the acquiring module together with the SSB position determined by the position determining module.

In an embodiment of the present disclosure, the detection mode determining module includes:
  a fourth determining submodule, configured to determine, in a case that either the frequency band of the SSB group where the current SSB is located or the frequency band of the current SSB belongs to the first frequency band, the first energy detection module as the energy detection mode for the current SSB; or
  a fifth determining submodule, configured to determine, in a case that either a frequency band of the SSB group where the current SSB is located or a frequency band of the current SSB belongs to a second frequency band, the second detection mode as the energy detection mode for the current SSB.

In an embodiment of the present disclosure, the detection mode determining module includes:
  a first analyzing submodule, configured to determine, through analyzing the current SSB, a physical broadcast channel PBCH;
  a second analyzing submodule, configured to determine, through analyzing the PBCH determined by the first analyzing submodule, configuration information to configure the first energy detection mode for the SSB group where the current SSB is located, or to configure the second energy detection mode for the current SSB; and
  a sixth determining submodule, configured to determine, according to the configuration information determined by the second analyzing submodule, the energy detection mode for the current SSB.

According to a fifth aspect of the embodiments of the present disclosure, there is provided a base station, including:

a processor; and a memory, configured to store instructions executable by the process;

wherein, the processor is configured to:

determine an energy detection mode for the current SSB, wherein the energy detection mode includes a first energy detection mode configured to perform, before transmitting at least two SSBs in an SSB group where the current SSB is located, energy detection on a channel in respective beam directions of at least two SSBs in an SSB group where the current SSB is located, and or a second energy detection mode configured to perform, before transmitting the current SSB, energy detection on a channel in a beam direction of the current SSB;

performing energy detection on a channel for the current SSB through the determined energy detection mode;

transmitting the current SSB in a case that the channel is idle.

According to a sixth aspect of the embodiments of the present disclosure, there is provided user equipment, including:

a processor;

a memory, configured to store instructions executable by the processor;

wherein, the processor is configured to:

receive a current SSB from a base station;

acquiring, from the current SSB, an index, a frame number and a half-frame indication of the current SSB;

determine an energy detection mode for the current SSB, wherein the energy detection mode includes a first energy detection mode configured to perform, before transmitting at least two SSBs in an SSB group where the current SSB is located, energy detection on a channel in respective beam directions of the at least two SSBs in the SSB group where the current SSB is located, or a second energy detection mode configured to perform, before transmitting the current SSB, energy detection on a channel in a beam direction of the current SSB;

determining an SSB position in the energy detection mode;

obtaining an absolute position of the current SSB according to an index, a frame number and a half-frame indication of the current SSB, and the position of the SSB.

According to a seventh aspect of the embodiments of the present disclosure, there is provided a computer-readable storage medium having computer instructions stored thereon, and in a case that the instructions are executed by a processor, the steps of the method of transmitting synchronization signal block SSB transmission are completed.

According to an eighth aspect of the embodiments of the present disclosure, there is provided a computer-readable storage medium having computer instructions stored thereon, and in a case that the instructions are executed by a processor, the steps of the method of synchronization signal block SSB demodulation are completed.

The technical solutions provided by the embodiments of the present disclosure may produce the following beneficial effects:

Through determining the energy detection mode for the current SSB, performing energy detection on the channel for the current SSB through the determined energy detection mode, and transmitting the current SSB in a case that the channel is idle, UE can obtain the absolute position of the current SSB, i.e., synchronization is achieved, so that it is flexible to perform LBT for SSB when the NR-U stands alone, thereby satisfying requirements of various frequency bands and of various network deployment.

The energy detection mode for the current SSB can be determined, and the SSB position in the energy detection mode can be determined, so that the absolute position of the current SSB can be obtained according to the index, the frame number and the half-frame indication of the current SSB, together with the SSB position, thereby achieving synchronization.

It should be understood that the above general description and the following detailed description are only exemplary and explanatory, and cannot be construed as a limit to the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION

The exemplary embodiments will be described in detail here, and examples thereof are illustrated in the accompanying drawings. When the following description refers to the accompanying drawings, unless otherwise indicated, the same reference signs in different drawings designate the same or similar elements. The implementation manners described in the following exemplary embodiments do not represent all implementation manners consistent with the present disclosure. Rather, they are merely examples of devices and methods consistent with some aspects of the present disclosure as set forth in the appended claims.

There are two LBT manners for SSB: one is large-scale-beam or omnidirectional LBT, and the other is directional LBT (that is, LBT based on each beam). The so-called large-scale-beam or omnidirectional LBT is to detect channel occupancy in a wide beam direction or in all directions, with an advantage of short total detection time. However, direction of the energy cannot be distinguished. In a case that the detected energy exceeds a certain threshold, it does not transmit signals in all directions. The directional LBT has high detection efficiency, but it takes a long time and detection may be performed for many times. Therefore, different manners of LBT may be adopted for different frequency bands and different network deployments.

In related arts, only one LBT manner is configured for an SSB, which makes the base station not flexible enough to perform LBT for the SSB when the NR-U stands alone, and the requirements of different frequency bands and different network deployments cannot be satisfied.

Figure 1:
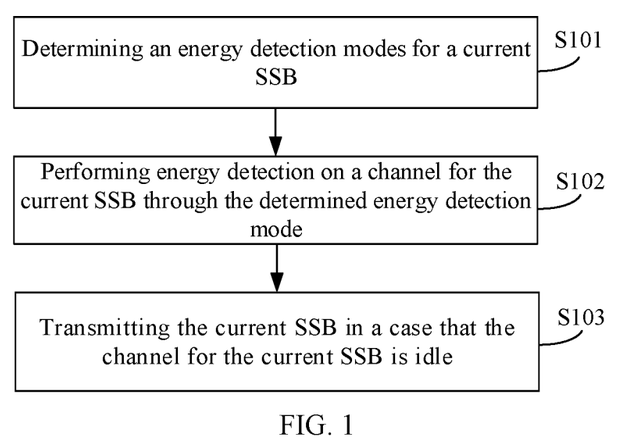
FIG. 1 is a flowchart of a method of SSB transmission according to an exemplary embodiment of the present disclosure.

FIG. 1 is a flowchart of a method of SSB transmission according to an exemplary embodiment of the present disclosure. This embodiment is described at the side of the base station. As illustrated in FIG. 1, the method of SSB transmission includes:

In step S101, an energy detection mode for a current SSB is determined. The energy detection mode includes a first energy detection mode configured to perform, before transmitting at least two SSBs in an SSB group where the current SSB is located, energy detection on a channel in respective beam directions of the at least two SSBs in the SSB group wherein the current SSB is located, or a second energy detection mode configured to perform, before transmitting the current SSB, energy detection on a channel in a beam direction of the current SSB.

For example, when the SSB group where the current SSB is located includes 4 SSBs, the at least two SSBs in the SSB group where the current SSB is located include 2 SSBs, 3 SSBs, or 4 SSBs. In an embodiment of the present disclosure, the at least two SSBs in the SSB group where the current SSB is located include all the SSBs in the SSB group where the current SSB is located.

The first energy detection mode can be configured to perform, before transmitting all SSBs in the SSB group where the current SSB is located, energy detection on the channels in the beam directions of all SSBs in the SSB group where the current SSB is located. For example, the first energy detection mode may be configured to perform, before transmitting the 4 SSBs in the SSB group where the current SSB is located, energy detection on the channels in the beam directions of all the 4 SSBs in the SSB group where the current SSB is located. In the energy detection mode, the time domain symbols of the 4 SSBs remain continuous. The second energy detection mode is configured to perform, before transmitting the current SSB, energy detection on a channel in a beam direction of the current SSB. That is, the second energy detection mode is configured to perform energy detection on the channel in the beam direction of each SSB before transmitting each SSB. Energy detection. In the energy detection mode, energy detection time is reserved before each SSB.

In this embodiment, the energy detection mode for the current SSB may be determined according to a frequency band. For example, in a case that either a frequency band of the SSB group where the current SSB is located or a frequency band of the current SSB belongs to a first frequency band, the first energy detection mode is determined as the energy detection mode for the current SSB; and in a case that either the frequency band of the SSB group where the current SSB is located or the frequency band of the current SSB belongs to the second frequency band, the second energy detection mode is determined as the energy detection mode for the current SSB. Thus, the implementation is simple.

In this embodiment, the energy detection mode for the current SSB may further be determined according to configuration information. For example, the configuration information is acquired from the current SSB, and the configuration information is to configure the first energy detection mode for the SSB group where the current SSB is located, or to configure the second energy detection mode for the current SSB. It is simple to be implemented to determine the energy detection mode for the current SSB according to the configuration information.

In addition, in an embodiment of the present disclosure, in order to determine the energy detection mode for the current SSB according to the configuration information, the method may further include: generating configuration information, and adding, to the physical broadcast channel (PBCH) of the current SSB, the configuration information.

In an embodiment of the present disclosure, the first energy detection mode or the second energy detection mode is set in a half-frame or a radio frame so as to facilitate user equipment (UE) to acquire the absolute position of the current SSB.

In step S102, energy detection is performed on a channel for the current SSB through the determined energy detection mode.

In step S103, the current SSB is transmitted in a case that the channel for the current SSB is idle.

In this embodiment, the base station may perform energy detection on the channel for the current SSB through the determined energy detection mode, and transmit the current SSB in a case that the channel for the current SSB is idle.

In the above embodiment, through determining the energy detection mode for the current SSB, energy detection is performed on the channel for the current SSB through the determined energy detection mode, and the current SSB is transmitted in a case that the channel for the current SSB is idle, such that UE can obtain the absolute position of the current SSB, that is, synchronization is achieved. Thus, it is flexible to perform LBT for SSB when the NR-U stands alone, and requirements of various frequency bands and various network deployments are satisfied.

Figure 2:
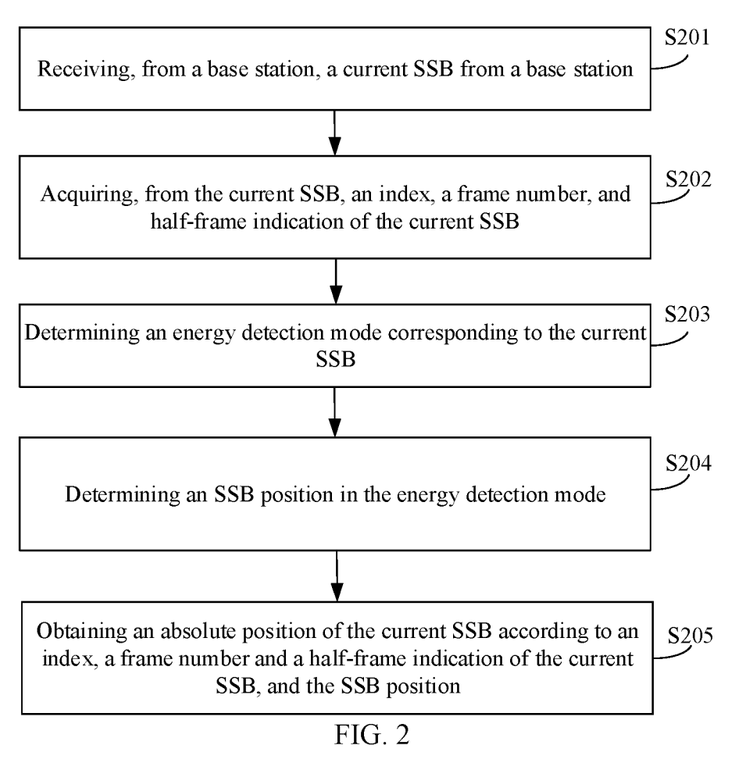
FIG. 2 is a flowchart of a method of SSB demodulation according to in an exemplary embodiment of the present disclosure.

FIG. 2 is a flowchart of a method of SSB demodulation according to an exemplary embodiment of the present disclosure. The method is described at the side of UE. As illustrated in FIG. 2, the method includes:

In step S201, a current SSB from a base station is received.

In step S202, an index, a frame number, and a half-frame indication of the current SSB are acquired from the current SSB.

In step S203, an energy detection mode for the current SSB is determined, wherein the energy detection mode includes a first energy detection mode configured to perform, before transmitting at least two SSBs in an SSB group where the current SSB is located, energy detection on a channel in respective beam directions of at least two SSBs in an SSBs group where the current SSB is located, or a second energy detection mode configured to perform, before transmitting the current SSB, energy detection on a channel in a beam direction of the current SSB.

In this embodiment, the energy detection mode for the current SSB may be determined according to a frequency band. For example, in a case that either a frequency band of the SSB group where the current SSB is located or a frequency band of the current SSB belongs to a first frequency band, the first energy detection mode is determined as the energy detection mode for the current SSB, and in a case that either the frequency band of the SSB group where the current SSB is located or the frequency band of the current SSB belongs to the second frequency band, the second energy detection mode is determined as the energy detection mode for the current SSB.

In this embodiment, further a PBCH may be determined through analyzing the current SSB, and configuration information may be determined through analyzing the PBCH, wherein the configuration information is configured to configure the first energy detection mode for the SSB group where the current SSB is located or to configure the second energy detection mode for the current SSB. And then, the energy detection mode for the current SSB is determined according to the configuration information.

In step S204, an SSB position in the determined energy detection mode is determined.

Since positions of the current SSB in different SSB mapping groups may be different in the first energy detection mode and in the second energy detection mode, it is necessary to determine the SSB position in the energy detection mode.

In step S205, an absolute position of the current SSB is obtained according to an index, a frame number and a half-frame indication of the current SSB, together with the SSB position.

The absolute position of the current SSB refers to an exact position of the current SSB in the time domain.

Since the SSB has a fixed position in the time domain in the current frequency band, the UE can obtain the exact position of the current SSB in the time domain after acquiring the index, the half-frame indication and the frame number of the current SSB together with the SSB position.

In the above embodiment, the energy detection mode for the current SSB may be determined, and the SSB position in the energy detection mode may be determined, so that the absolute position of the current SSB can be obtained according to the index, the frame number, and the half-frame indication of the current SSB, together with the SSB position, thereby achieving synchronization.

Figure 3:
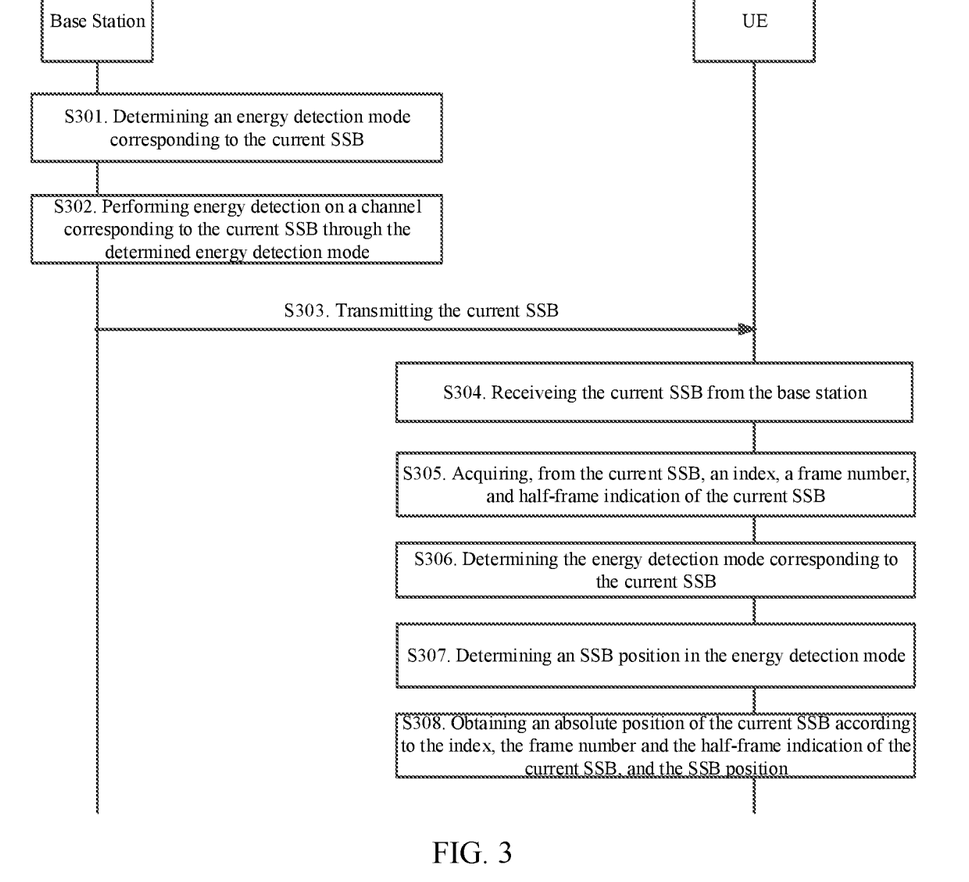
FIG. 3 is a signalling flow chart of a method of SSB demodulation according to in an exemplary embodiment of the present disclosure.

FIG. 3 is a signalling flow chart of a method of SSB demodulation according to an exemplary embodiment of the present disclosure. This embodiment is described from the perspective of interaction between a base station and UE. As illustrated in FIG. 3, the method includes:

In step S301, the base station determines an energy detection mode for the current SSB. The energy detection mode includes a first energy detection mode configured to perform, before transmitting at least two SSBs in an SSB group where the current SSB is located, energy detection on a channel in respective beam directions of the at least two SSBs in the SSB group where the current SSB is locate, or a second energy detection mode configured to perform, before transmitting the current SSB, energy detection on a channel in a beam direction of the current SSB.

In step S302, the base station performs energy detection on a channel for the current SSB through the determined energy detection mode.

In step S303, the base station transmits the current SSB in a case that the channel is idle.

In step S304, the UE receives the current SSB from the base station.

In step S305, the UE acquires, from the current SSB, an index, a frame number, and a half-frame indication of the current SSB.

In step S306, the UE determines the energy detection mode for the current SSB.

In step S307, the UE determines an SSB position in the energy detection mode.

In step S308, the UE obtains an absolute position of the current SSB according to the index, the frame number and the half-frame indication of the current SSB, together with the SSB position.

In the above embodiment, through the interaction between the base station and the UE, the UE can determine the energy detection mode for the current SSB, and determine the SSB position in the energy detection mode, so that the UE can determine the absolute position of the current SSB according to the index, the frame number, and the half-frame indication of the current SSB, together with the SSB position, thereby achieving synchronization.

Figure 4:
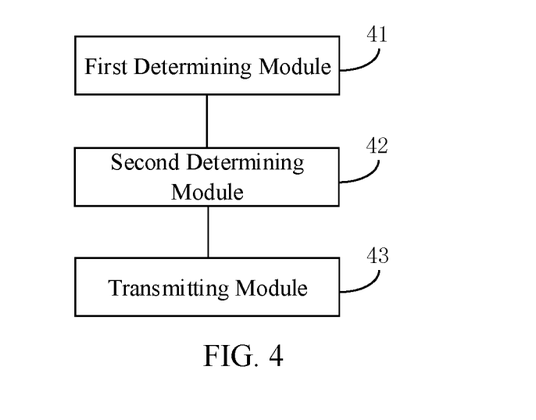
FIG. 4 is a block diagram illustrating a device of SSB transmission according to an exemplary embodiment.

FIG. 4 is a block diagram illustrating a device of SSB transmission according to an exemplary embodiment. The device may be provided in a base station. As illustrated in FIG. 4, the device includes: a first determining module 41, a second determining module 42 and a transmitting module 43.

The first determining module 41 is configured to determine an energy detection mode for a current SSB. The energy detection mode includes a first energy detection mode configured to perform, before transmitting at least two SSBs in an SSB group where the current SSB is located, energy detection on a channel in beams directions of the at least two SSBs in the SSB group where the current SSB is located, or a second energy detection mode configured to perform, before transmitting the current SSB, energy detection on a channel in a beam direction of the current SSB.

In an embodiment of the present disclosure, when the SSB group where the current SSB is located includes 4 SSBs, at least two SSBs in the SSB group where the current SSB is located include 2 SSBs, 3 SSBs, or 4 SSBs. In an embodiment of the present disclosure, the at least two SSBs in the SSB group where the current SSB is located include all SSBs in the SSB group where the current SSB is located.

In an embodiment of the present disclosure, the first energy detection mode may be configured to perform, before transmitting all the SSBs in the SSB group where the current SSB is located, energy detection on the channels in the beam directions of all the SSBs in the SSB group where the current SSB is located. For example, the first energy detection mode can be configured to perform, before transmitting the 4 SSBs in the SSB group where the current SSB is located, energy detection on the channels in the beam directions of the 4 SSBs in the SSB group where the current SSB is located. In the energy detection mode, the time domain symbols of the 4 SSBs remain continuous. The second energy detection mode is configured to perform, before transmitting each SSB, energy detection on a channel in the beam direction of the current SSB. That is, the second energy detection mode is configured to perform, before transmitting each SSB, a channel in the beam direction of each SSB. In this energy detection mode, energy detection time is reserved before each SSB.

Among them, the first energy detection mode or the second energy detection mode is set in a half-frame or a radio frame so as to facilitate the UE to obtain the absolute position of the current SSB.

The second determining module 42 is configured to perform energy detection on a channel for the current SSB through the energy detection mode determined by the first determining module 41.

The transmitting module 43 is configured to transmit, in a case that the second determining module 42 determines that the channel is idle, the current SSB.

In this embodiment, the base station can perform energy detection on the channel for the current SSB through the determined energy detection mode, and transmit the current SSB in a case that the channel for the current SSB is idle.

In the above embodiment, through determining the energy detection mode for the current SSB, performing energy detection on the channel for the current SSB through the determined energy detection mode, and transmitting the current SSB in a case that the channel for the current SSB is idle, the UE can obtain the absolute position of the current SSB, that is, achieving synchronization, thus, it is flexible to perform LBT for the SSB when the NR-U stands alone, thereby satisfying requirements of various frequency bands and various network deployment.

Figure 5:
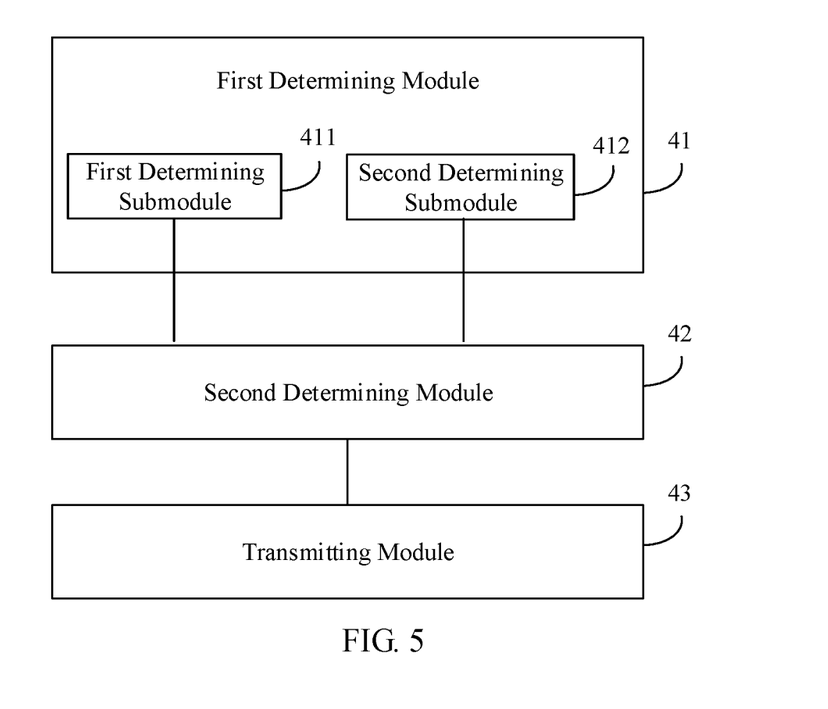
FIG. 5 is a block diagram illustrating a device of SSB transmission according to another exemplary embodiment.

FIG. 5 is a block diagram illustrating an SSB transmission device according to another exemplary embodiment. As illustrated in FIG. 5, based on the embodiment illustrated in FIG. 4, the first determining module 41 may include: a first determining submodule 411 or a second determining submodule 412.

The first determining submodule 411 is configured to determine the first energy detection mode as the energy detection mode for the current SSB in a case that either the frequency band of the SSB group where the current SSB is located or the frequency band of the current SSB belongs to the first frequency band.

The second determining submodule 412 is configured to determine the second energy detection mode as the energy detection mode for the current SSB in a case that either the frequency band of the SSB group where the current SSB is located or the frequency band of the current SSB belongs to the second frequency band.

In this embodiment, the energy detection mode for the current SSB can be determined according to the frequency band. For example, in a case that either the frequency band of the SSB group where the current SSB is located or the frequency band of the current SSB belongs to the first frequency band, the first energy detection mode is determined as the energy detection mode for the current SSB; and in a case that either the frequency band of the SSB group where the current SSB is located or the frequency band of the current SSB belongs to the second frequency band, the second energy detection mode is determined as the energy detection mode for the current SSB.

In the foregoing embodiment, the energy detection mode for the current SSB is determined according to the frequency band of the SSB group where the current SSB is located or the frequency band of the current SSB, and the implementation is simple.

Figure 6:
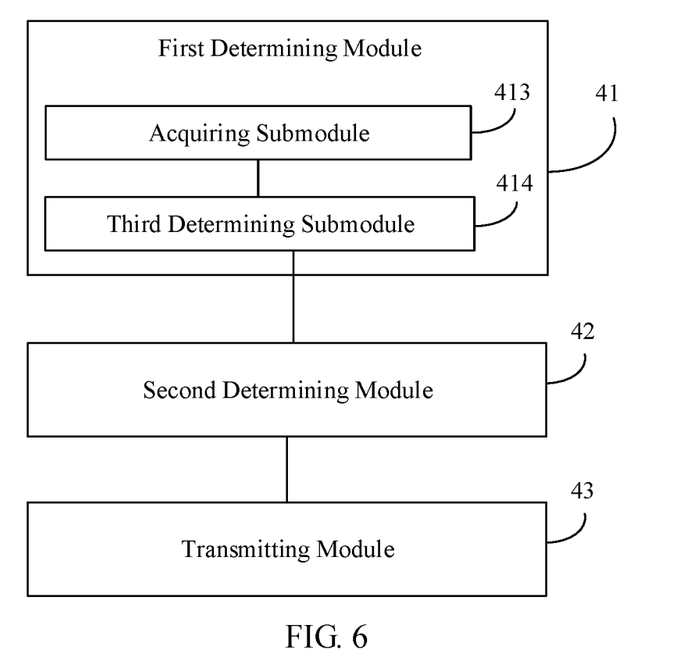
FIG. 6 is a block diagram illustrating a device of SSB transmission according to another exemplary embodiment.

FIG. 6 is a block diagram illustrating a device of SSB transmission according to another exemplary embodiment. As illustrated in FIG. 6, on the basis of the embodiment illustrated in FIG. 4, the first determining module 41 may include: an acquiring submodule 413 and a third determining submodule 414.

The acquiring submodule 413 is configured to acquire, from the current SSB, configuration information to configure the first energy detection mode for the SSB group where the current SSB is located or to configure the second energy detection mode for the current SSB.

The third determining submodule 414 is configured to determine, according to the configuration information obtained by the acquiring submodule 413, the energy detection mode for the current SSB.

In this embodiment, the energy detection mode for the current SSB can further be determined according to the configuration information. For example, the configuration information is acquired from the current SSB, and is configured to configure a first energy detection mode for the SSB group where the current SSB is located or to configure a second energy detection mode for the current SSB. The energy detection mode for the current SSB is determined according to the configuration information.

In the foregoing embodiment, the energy detection mode for the current SSB is determined according to the configuration information, which is simple to implement.

Figure 7:
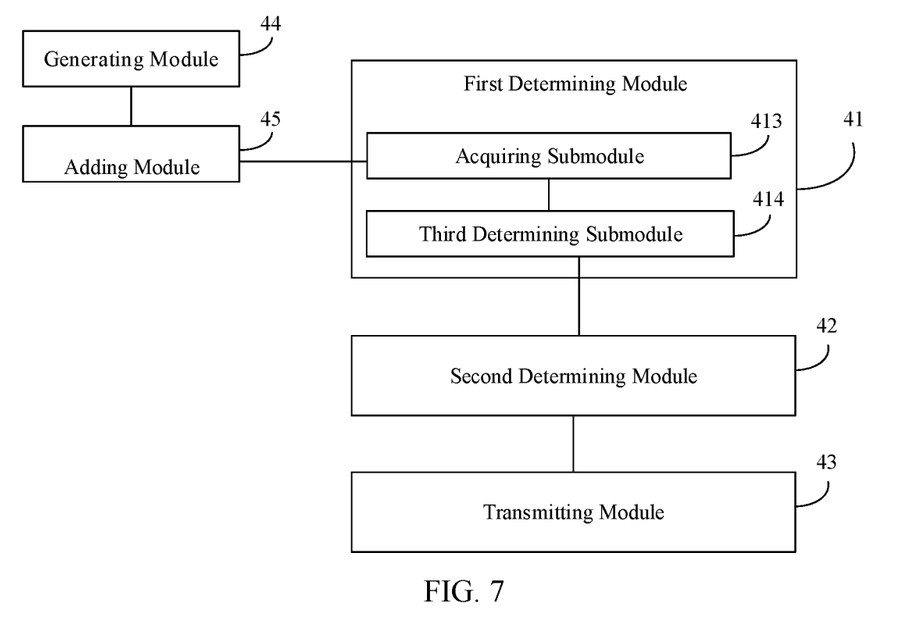
FIG. 7 is a block diagram illustrating a device of SSB transmission according to another exemplary embodiment.

FIG. 7 is a block diagram illustrating a device of SSB transmission according to another exemplary embodiment. As illustrated in FIG. 7, based on the embodiment illustrated in FIG. 6, the device may further include: a generating module 44 and an adding module 45.

The generating module 44 is configured to generate configuration information.

The adding module 45 is configured to add, to a physical broadcast channel (PBCH) of the current SSB, the configuration information generated by the generating module 44.

In the foregoing embodiment, through generating the configuration information and adding, to the PBCH of the current SSB, the configuration information generated by the generating module, it facilitates to determine subsequently the energy detection mode for the current SSB according to the configuration information.

Figure 8:
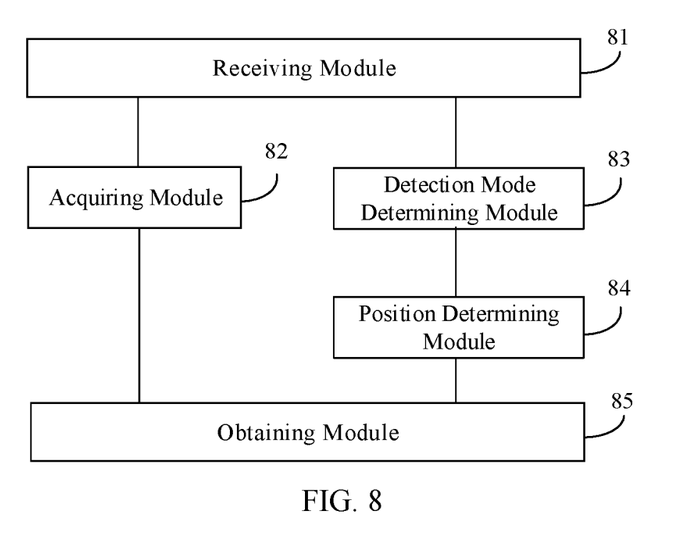
FIG. 8 is a block diagram illustrating a device of SSB demodulation according to an exemplary embodiment.

FIG. 8 is a block diagram illustrating a device of SSB demodulation according to an exemplary embodiment. The device is provided in UE. As illustrated in FIG. 8, the device may include: a receiving module 81, an acquiring module 82, and a detection mode determining module 83, a position determining module 84 and an obtaining module 85.

The receiving module 81 is configured to receive a current SSB from a base station.

The acquiring module 82 is configured to acquire, from the current SSB received by the receiving module 81, an index, a frame number, and a half-frame indication of the current SSB.

The detection mode determining module 83 is configured to determine an energy detection mode for the current SSB received by the receiving module 81. The energy detection mode includes a first energy detection mode configured to perform, before transmitting at least two SSBs in an SSB group where the current SSB is located, energy detection on a channel in respective beam directions of the at least two SSBs in the SSB group where the current SSB is located, or a second energy detection mode configured to perform, before transmitting the current SSB, energy detection on a channel in a beam direction of the current SSB.

The position determining module 84 is configured to determine an SSB position in the energy detection mode determined by the detection mode determining module 83.

The obtaining module 85 is configured to obtain, according to the index, the frame number, and the half-frame indication of the current SSB acquired by the acquiring module 82 together with the SSB position determined by the position determining module 84, an absolute position of the current SSB.

In an embodiment of the present disclosure, the absolute position of the current SSB refers to the exact position of the current SSB in the time domain.

Since the SSB has a fixed position in the time domain on the current frequency band, the UE may obtain the exact position of the current SSB in the time domain after obtaining the index, the frame number and the half-frame indication of the current SSB.

In the above embodiment, the energy detection mode for the current SSB can be determined, and the SSB position in the energy detection mode can be determined, so that the absolute position of the current SSB may be obtained according to the index, the frame number and the half-frame indication of the current SSB, together with the SSB position, thereby achieving synchronization.

Figure 9:
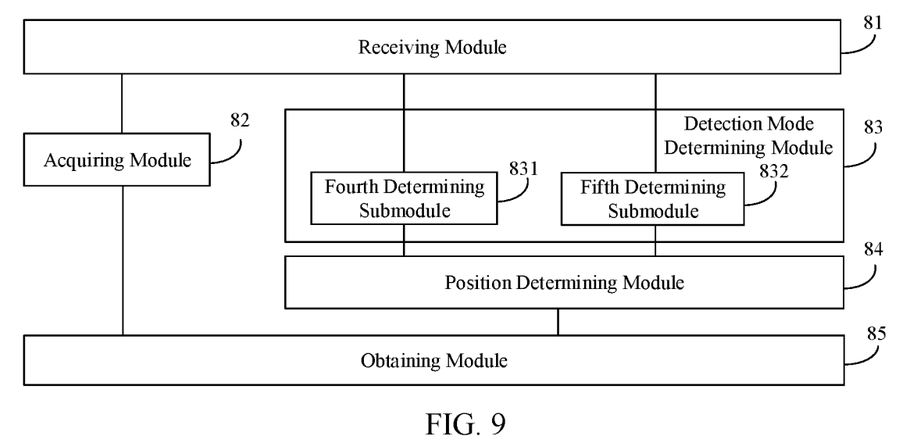
FIG. 9 is a block diagram illustrating a device of SSB demodulation according to another exemplary embodiment.

FIG. 9 is a block diagram illustrating a device of SSB demodulation according to another exemplary embodiment. As illustrated in FIG. 9, on the basis of the embodiment illustrated in FIG. 8 above, the detection mode determining module 83 may include: a fourth determining submodule 831 or a fifth determining submodule 832.

The fourth determining submodule 831 is configured to determine the first energy detection mode as the energy detection mode for the current SSB in a case that either the frequency band of the SSB group where the current SSB is located or the frequency band of the current SSB belongs to the first frequency band.

The fifth determining submodule 832 is configured to determine the second energy detection mode as the energy detection mode for the current SSB in a case that either the frequency band of the SSB group where the current SSB is located or the frequency band of the current SSB belongs to the second frequency band.

In this embodiment, the energy detection mode for the current SSB can be determined according to the frequency band. For example, the first energy detection mode is determined as the energy detection mode for the current SSB in a case that either the frequency band of the SSB group where the current SSB is located or the frequency band of the current SSB belongs to the first frequency band, and the second energy detection mode is determined as the energy detection mode for the current SSB in a case that either the frequency band of the SSB group where the current SSB is located or the frequency band of the current SSB belongs to the second frequency band.

In the foregoing embodiment, the energy detection mode for the current SSB is determined according to the frequency band of the SSB group where the current SSB is located or the frequency band of the current SSB, which is simple to implement.

Figure 10:
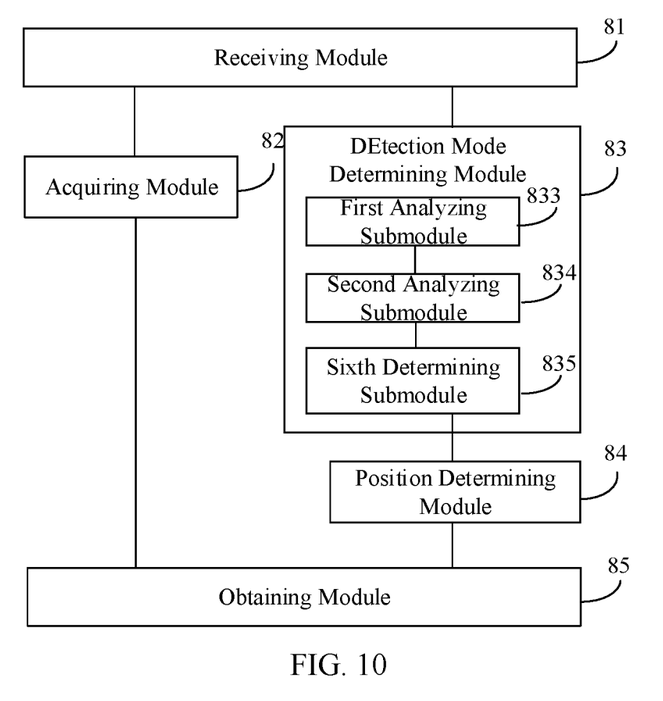
FIG. 10 is a block diagram illustrating a device of SSB demodulation device according to another exemplary embodiment.

FIG. 10 is a block diagram illustrating a device of SSB demodulation according to another exemplary embodiment. As illustrated in FIG. 10, on the basis of the embodiment illustrated in FIG. 8, the detection mode determining module 83 may include: a first analyzing submodule 833, a second analyzing submodule 834, and a sixth determining submodule 835.

The first analyzing submodule 833 is configured to determine a physical broadcast channel PBCH through analyzing the current SSB.

The second analyzing submodule 834 is configured to determine configuration information through analyzing the PBCH determined by the first parsing submodule 833, wherein the configuration information is to configure the first energy detection mode for the SSB group where the current SSB is located or to configure the second energy detection mode for the current SSB.

The sixth determining submodule 835 is configured to determine an energy detection mode for the current SSB according to the configuration information determined by the second analyzing submodule 834.

In this embodiment, it is further possible to determine the PBCH through analyzing the current SSB and then determine the configuration information through analyzing the PBCH, wherein the configuration information is to configure the first energy detection mode for the SSB group where the current SSB is located or to configure the second energy detection mode for the current SSB, and then the energy detection mode for the current SSB is determined according to the configuration information.

In the foregoing embodiment, the energy detection mode for the current SSB is determined according to the determined configuration information, which is simple to implement.

Figure 11:
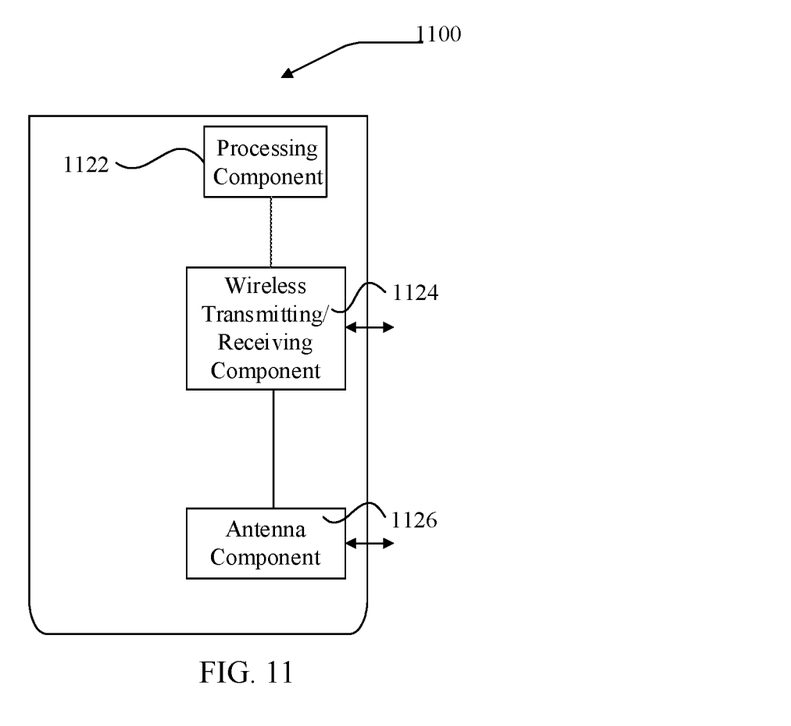
FIG. 11 is a block diagram illustrating an apparatus applicable to SSB transmission according to an exemplary embodiment.

FIG. 11 is a block diagram illustrating an apparatus of SSB transmission according to an exemplary embodiment. The apparatus 1100 may be provided as a base station. Referring to FIG. 11, the apparatus 1100 includes a processing component 1122, a wireless transmitting/receiving component 1124, an antenna component 1126, and a signal processing part dedicated to a wireless interface. The processing component 1122 may further include one or more processors.

One processor of the processing component 1122 may be configured to:

determine an energy detection mode corresponding a current SSB, wherein the energy detection mode includes a first energy detection mode configured to perform, before transmitting at least two SSBs in an SSB group where the current SSB is located, energy detection on a channel in respective beam directions of the at least two SSBs in the SSB group where the current SSB is located, or a second energy detection mode configured to perform, before transmitting the current SSB, energy detection on a channel in a beam direction of the current SSB;

perform energy detection on a channel for the current SSB through the determined energy detection mode; and transmit the current SSB in a case that the channel is idle.

In an exemplary embodiment, there is further provided a non-transitory computer-readable storage medium having instructions, which can be executed by the processing component 1122 of the apparatus 1100 to perform the foregoing method of SSB transmission. For example, the non-transitory computer-readable storage medium may be an ROM, a random-access memory (RAM), a CD-ROM, a magnetic tape, a floppy disk, an optical data storage device, and etc.

Figure 12:
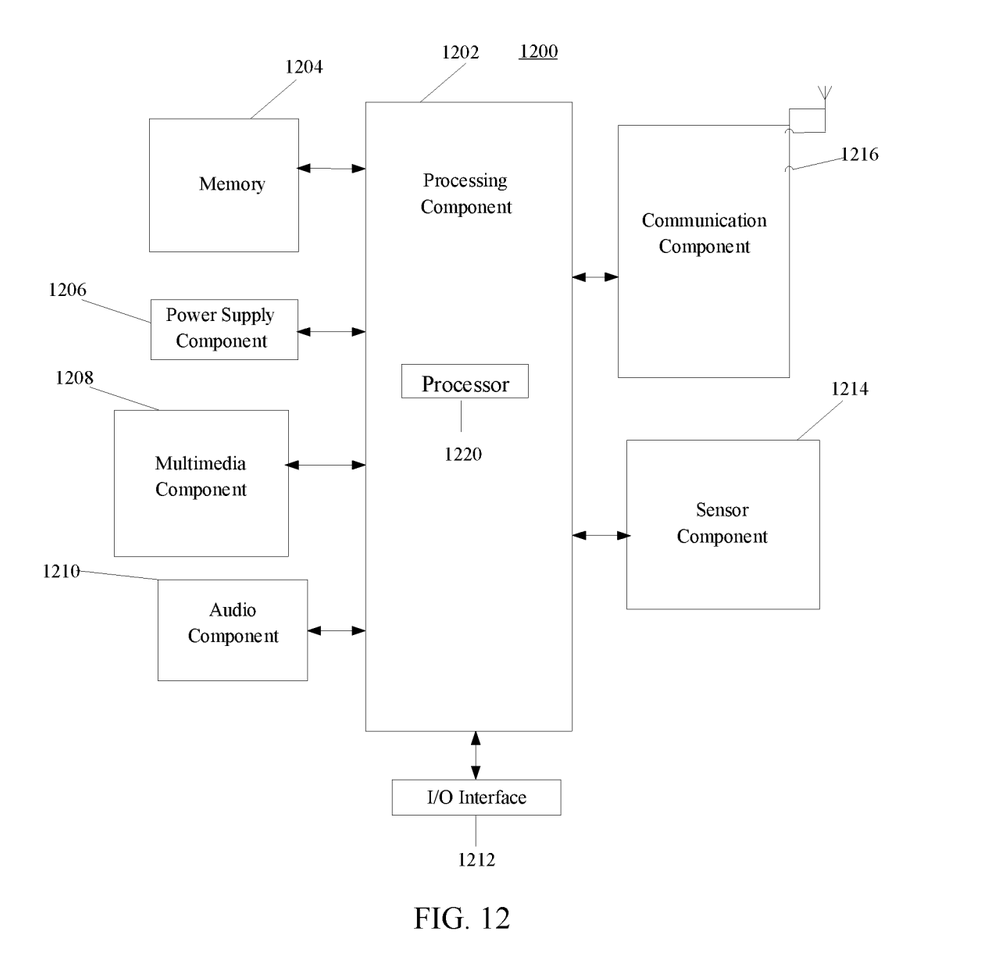
FIG. 12 is a block diagram illustrating an apparatus applicable to SSB demodulation according to an exemplary embodiment.

FIG. 12 is a block diagram illustrating an apparatus applicable to SSB demodulation according to an exemplary embodiment. For example, the apparatus 1200 may be UE such as a mobile phone, a computer, a digital broadcasting terminal, a messaging device, a game console, a tablet device, a medical device, a fitness device, a personal digital assistant and etc.

Referring FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the overall operations of the apparatus 1200, such as operations associated with display, telephone call, data communication, camera operation, and recording operation. The processing component 1202 may include one or more processors 1220 to execute instructions to perform all or part steps of the foregoing method. In addition, the processing component 1202 may include one or more modules to facilitate interaction between the processing component 1202 and other components. For example, the processing component 1202 may include a multimedia module to facilitate interaction between the multimedia component 1208 and the processing component 1202.

One of processors 1220 in the processing component 1202 may be configured to:
receive, from a base station, a current SSB;
acquire, from the current SSB, an index, a frame number and a half-frame indication of the current SSB;
determine an energy detection mode for the current SSB, wherein the energy detection mode includes a first energy detection mode configured to perform, before transmitting at least two SSBs in an SSB group where the current SSB is located, energy detection on a channel in beam directions of the at least two SSBs in the SSB group where the current SSB is located, or a second energy detection mode configured to perform, before transmitting the current SSB, energy detection on a channel in a beam direction of the current SSB;
determine an SSB position in the energy detection mode;
obtain, according to the index, the frame number, and the half-frame indication of the current SSB, together with the SSB position, an absolute position of the current SSB.

The memory 1204 is configured to store various types of data so as to support the operations of the apparatus 1200. Examples of the data include instructions for any application or method operated on the apparatus 1200, contact data, phone book data, messages, pictures, videos, and etc. The memory 1204 can be implemented by any type of volatile or non-volatile storage devices or their combination, such as a static random access memory (SRAM), an electrically erasable programmable read-only memory (EEPROM), erasable Programmable read only memory (EPROM), a programmable read only memory (PROM), a read only memory (ROM), a magnetic memory, a flash memory, a magnetic or optical disk.

The power supply component 1206 provides power for various components of the apparatus 1200. The power supply component 1206 may include a power management system, one or more power supplies, and other components associated with generation, management, and distribution of power for the apparatus 1200.

The multimedia component 1208 includes a screen that provides an output interface between the apparatus 1200 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touch, sliding, and gestures on the touch panel. The touch sensor can not only sense the touch or the boundary of the slide action, but also detect duration and pressure related to the touch or slide operation. In some embodiments, the multimedia component 1208 includes a front camera and/or a rear camera. When the apparatus 1200 is in an operation mode, such as a photographing mode or a video mode, the front camera and/or the rear camera can receive external multimedia data. Each front camera and rear camera can be a fixed optical lens system or have focal length and optical zooming capabilities.

The audio component 1210 is configured to output and/or input audio signals. For example, the audio component 1210 includes a microphone (MIC). When the apparatus 1200 is in an operation mode, such as a call mode, a recording mode, and a voice recognition mode, the microphone is configured to receive external audio signals. The received audio signal may be further stored in the memory 1204 or transmitted via the communication component 1216. In some embodiments of the present disclosure, the audio component 1210 further includes a speaker for outputting audio signals.

The I/O interface 1212 provides an interface between the processing component 1202 and a peripheral interface module. The peripheral interface module may be a keyboard, a click wheel, a button, and the like. These buttons may include but are not limited to: home button, volume button, start button, and lock button.

The sensor component 1214 includes one or more sensors for providing the apparatus 1200 with status assessment in various aspects. For example, the sensor component 1214 can detect the ON/OFF status of the apparatus 1200 and relative positioning of components, such as the display and a keypad of the apparatus 1200. The sensor component 1214 can further detect position change of the apparatus 1200 or a component of the apparatus 1200, presence or absence of contact of a user with the apparatus 1200, orientation or acceleration/deceleration of the apparatus 1200 and change in temperature of the apparatus 1200. The sensor assembly 1214 may include a proximity sensor configured to detect presence of nearby objects without physical contact. The sensor component 1214 may further include an optical sensor, such as a CMOS or CCD image sensor, for imaging applications. In some embodiments of the present disclosure, the sensor component 1214 may further include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 can access a wireless network based on a communication standard, such as WiFi, 2G or 3G, or a combination thereof. In an exemplary embodiment of the present disclosure, the communication component 1216 receives a broadcast signal or broadcast related information from an external broadcast management system via a broadcast channel. In an exemplary embodiment of the present disclosure, the communication component 1216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment of the present disclosure, the apparatus 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, so as to perform the above methods.

In an exemplary embodiment of the present disclosure, there is further provided a non-transitory computer-readable storage medium having instructions, such as the memory 1204 having instructions, which can be executed by the processor 1220 of the device 1200 to complete the foregoing methods. For example, the non-transitory computer-readable storage medium may be a ROM, a random access memory (RAM), a CD-ROM, a magnetic tape, a floppy disk, an optical data storage device, and etc.

As for the device embodiments, since they substantially correspond to the method embodiments, the relevant part can be referred to the part of the description of the method embodiments. The device embodiments described above are merely illustrative, where the units described as separate components may or may not be physically separated, and the components illustrated as one unit may or may not be physical units, that is, they may be located in one place, or it may be distributed on multiple network units. Some or all of the modules may be selected according to actual requirements to achieve the objectives of the solutions of the embodiments. One of ordinary skill in the art can understand and implement it without any creative work.

It should be noted that in the present disclosure, relational terms such as first and second are only used to distinguish one entity or operation from another entity or operation, and do not necessarily suggest or imply any actual relationship or sequence between these entities or operations. The terms "include", "comprise" or any other variants thereof are intended to cover non-exclusive inclusion, so that a process, method, article or device including a series of elements not only includes those elements, but also includes other elements not explicitly listed, or further include elements inherent to such processes, methods, articles, or devices. When there are no more restrictions, the element defined by the sentence "including a . . . " does not exclude the existence of other identical elements in the process, the method, the article or the equipment that includes the element.

After considering the specification and practicing the disclosure disclosed herein, one of ordinary skill in the art will easily conceive of other embodiments of the present disclosure. This disclosure is intended to cover any variations, applications, or adaptive changes of the present disclosure. These variations, applications, or adaptive changes follow the general principles of the present disclosure and include common knowledge or conventional technical means in the art not recorded in the present disclosure. The description and the embodiments are only illustrative, and the true scope and spirit of the present disclosure are set forth in the appended claims.

It should be understood that the present disclosure is not limited to the exact structure that has been described above and illustrated in the drawings, and various modifications and changes can be made without departing from the scope of the present disclosure. The scope of the present disclosure is only limited by the appended claims.

What is claimed is:

1. A method of synchronization signal block (SSB) transmission, which is applicable to a base station, comprising:
   acquiring, fro a current SSB, configuration information to configure a first energy detection mode for an SSB group where the current SSB is located or to configure a second energy detection mode for the current SSB; and
   determining an energy detection mode for the current SSB according to the configuration information, wherein
   the first energy detection mode is configured to perform, before transmitting at least two SSBs in the SSB group where the current SSB is located, energy detection on a channel in respective beam directions of the at least two SSBs in the SSB group where the current SSB is located, or
   the second energy detection mode is configured to perform, before transmitting the current SSB, energy detection on a channel in a beam direction of the current SSB;
   performing, through the determined energy detection mode, energy detection on a channel for the current SSB; and
   transmitting the current SSB in a case that the channel for the current SSB is idle.

2. The method according to claim 1, further comprising:
   determining, in a case that either a frequency band of the SSB group where the current SSB is located or a frequency band of the current SSB belongs to a first frequency band, the first energy detection mode as the energy detection mode for the current SSB; or
   determining, in a case that either the frequency band of the SSB group where the current SSB is located or the frequency band of the current SSB belongs to a second frequency band, the second energy detection mode as the energy detection mode for the current SSB.

3. The method according to claim 1, further comprising:
   generating the configuration information; and
   adding, to a physical broadcast channel PBCH of the current SSB, the configuration information.

4. The method according to claim 1, wherein the first energy detection mode or the second energy detection mode is set in a half-frame or a radio frame.

5. A non-transitory computer-readable storage medium having computer instructions stored thereon for execution by a processor to perform steps of the method according to claim 1.

6. A communication system implementing the method according to claim 1, comprising the base station, and user equipment (UE) configured to:
   receive, from the base station, the current SSB;
   acquire, from the current SSB, an index, a frame number, and a half-frame indication of the current SSB;
   determine configuration information to configure a first energy detection mode for an SSB group in which the current SSB is located or to configure a second energy detection mode for the current SSB, wherein
   the first energy detection mode configured to perform, before transmitting at least two SSBs in the SSB group where the current SSB is located, energy detection on a channel in respective beam directions of the at least two SSBs in the SSB group where the current SSB is located, or
   the second energy detection mode configured to perform, before transmitting the current SSB, energy detection on a channel in a beam direction of the current SSB;
   determine an energy detection mode for the current SSB according to the configuration information;
   determine an SSB position in the determined energy detection mode; and
   obtaining, according to the index, the frame number, and the half-frame indication of the current SSB together with the SSB position, an absolute position of the current SSB to thereby achieve synchronization and flexibility to perform listen before talk (LBT) for SSB when a 5th Generation (5G) New Radio Unlicensed Spectrum (NR-U) stands alone, and satisfy requirements of various frequency bands and of various network deployments.

7. A method of synchronization signal block SSB demodulation, which is applicable to user equipment (UE), comprising:
    receiving, from a base station, a current SSB;
    acquiring, from the current SSB, an index, a frame number, and a half-frame indication of the current SSB;
    determining configuration information to configure a first energy detection mode for an SSB group in which the current SSB is located or to configure a second energy detection mode for the current SSB, wherein
        the first energy detection mode is configured to perform, before transmitting at least two SSBs in the SSB group where the current SSB is located, energy detection on a channel in respective beam directions of the at least two SSBs in the SSB group where the current SSB is located, or
        the second energy detection mode is configured to perform, before transmitting the current SSB, energy detection on a channel in a beam direction of the current SSB;
    determining an energy detection mode for the current SSB according to the configuration information;
    determining an SSB position in the determined energy detection mode; and
    obtaining, according to the index, the frame number, and the half-frame indication of the current SSB together with the SSB position, an absolute position of the current SSB.

8. The method according to claim 7, further comprising:
    determining, in a case that either a frequency band of the SSB group where the current SSB is located or a frequency band of the current SSB belongs to a first frequency band, the first energy detection mode as the energy detection mode for the current SSB; or
    determining, in a case that either the frequency band of the SSB group where the current SSB is located or the frequency band of the current SSB belongs to a second frequency band, the second energy detection mode as the energy detection mode for the current SSB.

9. The method according to claim 7, further comprising:
    determining, through analyzing the current SSB, a physical broadcast channel PBCH;
    determining, through analyzing the PBCH, the configuration information.

10. User equipment (UE) implementing the method according to claim 7, comprising:
    a processor;
    memory configured to store instructions executable by the processor;
    wherein, in a case that the instructions are executed, the processor is configured to perform operations of the method.

11. The UE according to claim 10, wherein the processor is further configured to:
    determine the first energy detection mode as the energy detection mode corresponding to the current SSB, when the frequency band of the SSB group where the current SSB is located or the frequency band of the current SSB belongs to the first frequency band; or
    determine the second energy detection mode as the energy detection mode corresponding to the current SSB, when the frequency band of the SSB group where the current SSB is located or the frequency band of the current SSB belongs to the second frequency band.

12. The UE according to claim 10, wherein the processor is further configured to:
    determine, through analyzing the current SSB, a physical broadcast channel PBCH;
    determining, through analyzing the PBCH, the configuration information.

13. A non-transitory computer-readable storage medium having computer instructions stored thereon for execution by a processor to perform steps of the method according to claim 7.

14. The non-transitory computer-readable storage medium according to claim 13, wherein the computer instructions stored thereon for execution by the processor to further perform:
    determining, in a case that either a frequency band of the SSB group where the current SSB is located or a frequency band of the current SSB belongs to a first frequency band, the first energy detection mode as the energy detection mode for the current SSB; or
    determining, in a case that either the frequency band of the SSB group where the current SSB is located or the frequency band of the current SSB belongs to a second frequency band, the second energy detection mode as the energy detection mode for the current SSB.

15. A base station, comprising:
    a processor; and
    memory, configured to store instructions executable by the processor;
    wherein the processor is configured to:
    acquire, from a current SSB, configuration information to configure a first energy detection mode for an SSB group where the current SSB is located or to configure a second energy detection mode for the current SSB; and determine an energy detection mode for the current SSB according to the configuration information, wherein the first energy detection mode is configured to perform, before transmitting at least two SSBs in the SSB group where the current SSB is located, energy detection on a channel in respective beam directions of the at least SSBs in the SSB group where the current SSB is located, or the second energy detection mode is configured to perform, before transmitting the current SSB, energy detection on a channel in a beam direction of the current SSB;
    perform energy detection on a channel for the current SSB through the determined energy detection mode; and
    transmit the current SSB in a case that the channel for the current SSB is idle.

16. The base station according to claim 15, wherein the processor is further configured to:
    determine the first energy detection mode as the energy detection mode corresponding to the current SSB, when the frequency band of the SSB group where the current SSB is located or the frequency band of the current SSB belongs to the first frequency band; or
    determine the second energy detection mode as the energy detection mode corresponding to the current SSB, when the frequency band of the SSB group where the current SSB is located or the frequency band of the current SSB belongs to the second frequency band.

17. The base station according to claim 15, wherein the processor is further configured to:
    generate the configuration information; and
    add, to a physical broadcast channel (PBCH) of the current SSB, the configuration information.

18. The base station according to claim 15, wherein the first energy detection mode or the second energy detection mode is set in a half-frame or a radio frame.

* * * * *